UNITED STATES PATENT OFFICE.

ALBERT E. GREENE, OF CHICAGO, ILLINOIS, ASSIGNOR TO AMERICAN ELECTRIC SMELTING AND ENGINEERING COMPANY, OF ST. LOUIS, MISSOURI, A CORPORATION OF MISSOURI.

PROCESS OF DESULFURIZING ORES AND METALS.

1,056,900. Specification of Letters Patent. Patented Mar. 25, 1913.

No Drawing. Application filed August 5, 1910. Serial No. 575,613.

*To all whom it may concern:*

Be it known that I, ALBERT E. GREENE, a citizen of the United States, residing at Chicago, in the county of Cook and State of Illinois, have invented a certain new and useful Improvement in Processes of Desulfurizing Ores and Metals, of which the following is a full, clear, concise, and exact description.

My invention relates to an improved process of desulfurizing pig iron and iron pyrites.

The chief object of my invention is to refine pig iron or iron pyrites by extracting therefrom sulfur or like impurities and at the same time to avoid the production of noxious fumes.

A further object is to convert the eliminated impurities into valuable by-products.

My invention consists in adding to the above mentioned ore or metal a slagging agent (such as one or more of the compounds of the alkaline earth group, as, for example, lime or fluorspar) and a reducing agent, as, for example, coke, and heating the charge to a temperature sufficiently high to cause the sulfur or like impurities to combine with the metallic element of the slag, for example in the case of a lime slag, to form calcium sulfid.

The process is preferably carried out in an electric furnace, since temperature regulation is more readily secured in such furnace.

The sulfid compounds after being slagged from the metal in the usual manner can subsequently be oxidized into sulfates, thereby becoming converted into valuable by-products.

As illustrative of the process I will first describe the treatment of pig iron for the removal of sulfur therefrom. The charge consisting of pig iron or spiegel iron, a suitable slag, as, for example, lime and fluorspar, and a reducing agent such as coke is introduced into a suitable electric furnace. Under the influence of a temperature of about 1300° to 1400° C., the reducing agent acts on the lime and fluorspar in such a manner as to cause it to take up the sulfur from the metal in the form of sulfids. There is, of course, no decarburizing of the metal on account of the presence of carbon in the slag. It is essential that oxids of iron and manganese should be practically absent, for otherwise the sulfur will not be taken up by the slag. The sulfid after separation of the slag from the metal may be oxidized at approximately a temperature of 400° C. to sulfate by means of steam under pressure. The slag is thus converted into a valuable by-product.

In the case of the process of my invention the absence of any oxid of the metal or metals being refined permits the calcium or other alkaline earth metal to freely combine with sulfur to form sulfids.

What I claim is:

1. The process of treating iron compounds containing sulfur to eliminate the sulfur therefrom, which consists in melting a charge of said iron compound together with a reducing agent and a slag composed of an alkaline earth compound such as lime or fluorspar, in an electric furnace, at a temperature high enough to cause the sulfur to combine with the metallic element of the slag without appreciable formation of noxious fumes.

2. The process of removing sulfur from pig iron, which consists in heating molten pig iron in an electric furnace simultaneously with a lime slag and a reducing agent to a temperature high enough to separate the sulfur and phosphorus as sulfids and phosphids, respectively.

3. The process of treating pig iron, which consists in maintaining it at a temperature of approximately 1350° C. in an electric furnace, and simultaneously treating it with a suitable slag and a reducing agent to separate the sulfur.

In witness whereof, I, hereunto subscribe my name this 4th day of August A. D., 1910.

ALBERT E. GREENE.

Witnesses:
GEO. C. DAVISON,
GEORGE E. FOLK.